(12) United States Patent
Calhoun et al.

(10) Patent No.: US 10,711,086 B2
(45) Date of Patent: Jul. 14, 2020

(54) PHOSPHATE ESTER-MODIFIED ACRYLIC POLYOLS

(71) Applicant: BASF SE, Ludwigshafen (DE)

(72) Inventors: Eric Calhoun, Wyandotte, MI (US); Timothy Klots, Plymouth, MI (US)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 15/517,788

(22) PCT Filed: Oct. 7, 2015

(86) PCT No.: PCT/US2015/054442
§ 371 (c)(1),
(2) Date: Apr. 7, 2017

(87) PCT Pub. No.: WO2016/057639
PCT Pub. Date: Apr. 14, 2016

(65) Prior Publication Data
US 2017/0298173 A1    Oct. 19, 2017

Related U.S. Application Data

(60) Provisional application No. 62/061,558, filed on Oct. 8, 2014.

(51) Int. Cl.
| *C08F 230/02* | (2006.01) |
| *C08G 18/62* | (2006.01) |
| *C08G 18/79* | (2006.01) |
| *C09D 175/04* | (2006.01) |
| *C08G 79/02* | (2016.01) |
| *C08L 85/02* | (2006.01) |
| *C09D 185/02* | (2006.01) |
| *C09D 143/02* | (2006.01) |

(52) U.S. Cl.
CPC ........ *C08G 18/6233* (2013.01); *C08F 230/02* (2013.01); *C08G 18/792* (2013.01); *C08G 79/02* (2013.01); *C08L 85/02* (2013.01); *C09D 143/02* (2013.01); *C09D 175/04* (2013.01); *C09D 185/02* (2013.01)

(58) Field of Classification Search
CPC .................... C08F 230/02; C08G 18/6233
See application file for complete search history.

(56) References Cited

U.S. PATENT DOCUMENTS

| 3,855,364 A | 12/1974 | Steckler |
| 4,044,044 A * | 8/1977 | Saito .................. C09J 4/00 |
| | | 156/332 |
| 4,361,692 A | 11/1982 | Ammons |
| 7,297,748 B2 | 11/2007 | Trivedi |
| 7,439,292 B2 | 10/2008 | Destarac et al. |
| 2002/0153507 A1 | 10/2002 | Savino et al. |
| 2006/0047085 A1 * | 3/2006 | Trivedi ............... C08F 220/26 |
| | | 525/329.7 |
| 2014/0121317 A1 | 5/2014 | Takahashi et al. |

FOREIGN PATENT DOCUMENTS

| CN | 101580579 A | 11/2009 |
| DE | 38 07 588 A1 | 10/1988 |
| JP | 03-100084 A | 4/1991 |
| JP | 2009-203398 A | 9/2009 |

OTHER PUBLICATIONS

Vazo 67 Product Safety Summary Sheet (2012) (Year: 2012).*
International Search Report & Written Opinion in International Application No. PCT/US2015/054442, dated Jan. 22, 2016 (15 pages).
Lee, Jae Young et al.,"Characterization of clearcoats containing phosphoric acid-functionalized acrylic polyols for automotive precoated metal sheet coatings," Journal of Coatings Technology and Research, Sep. 2014, vol. 11, Issue 5, pp. 697-710.
Extended European Search Report in EP Application No. 15848199. 4, dated May 3, 2018 (8p pages).

* cited by examiner

*Primary Examiner* — Robert C Boyle
(74) *Attorney, Agent, or Firm* — Foley & Lardner LLP

(57) ABSTRACT

A composition includes a polyphosphoric acid-modified acrylic polyol, wherein the polyphosphoric acid-modified acrylic polyol has greater than zero, but less than 1.0 wt % modification with polyphosphoric acid.

16 Claims, 3 Drawing Sheets

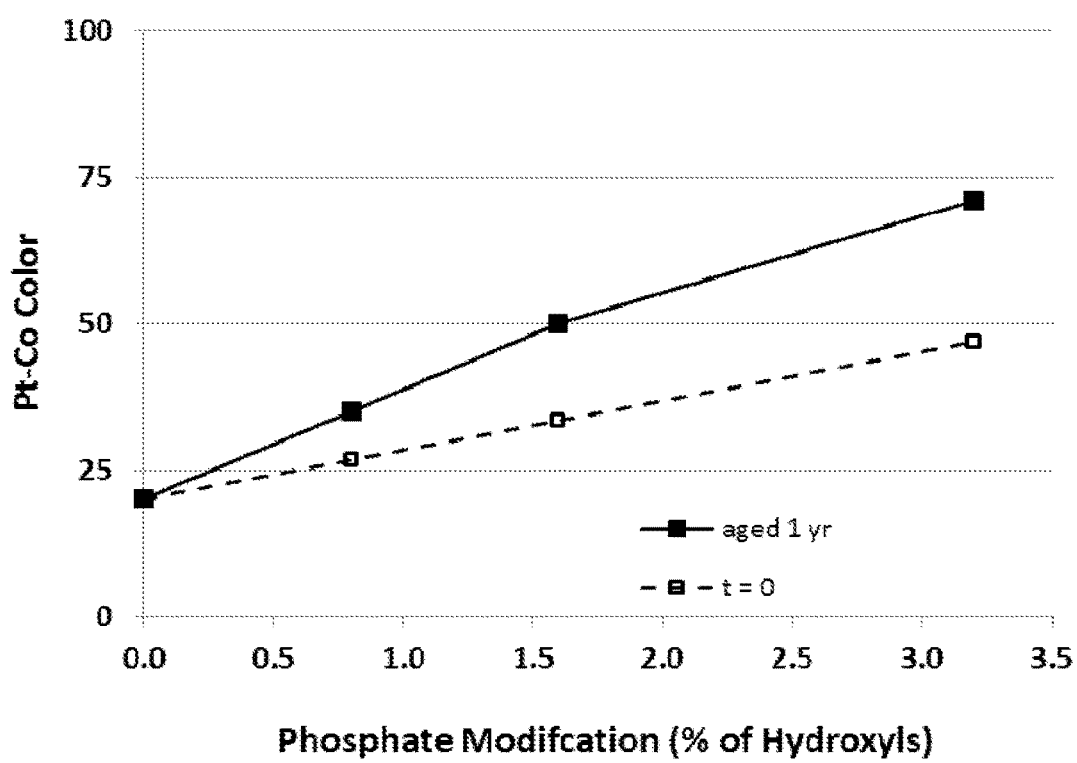

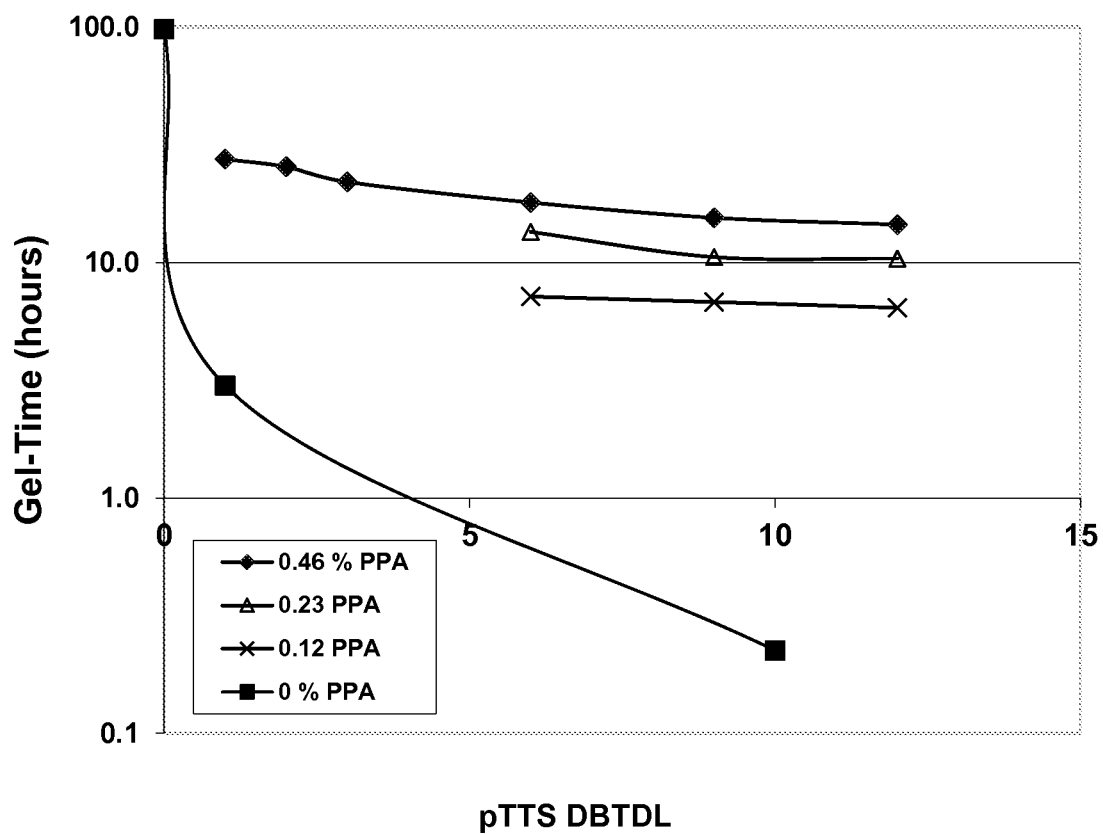

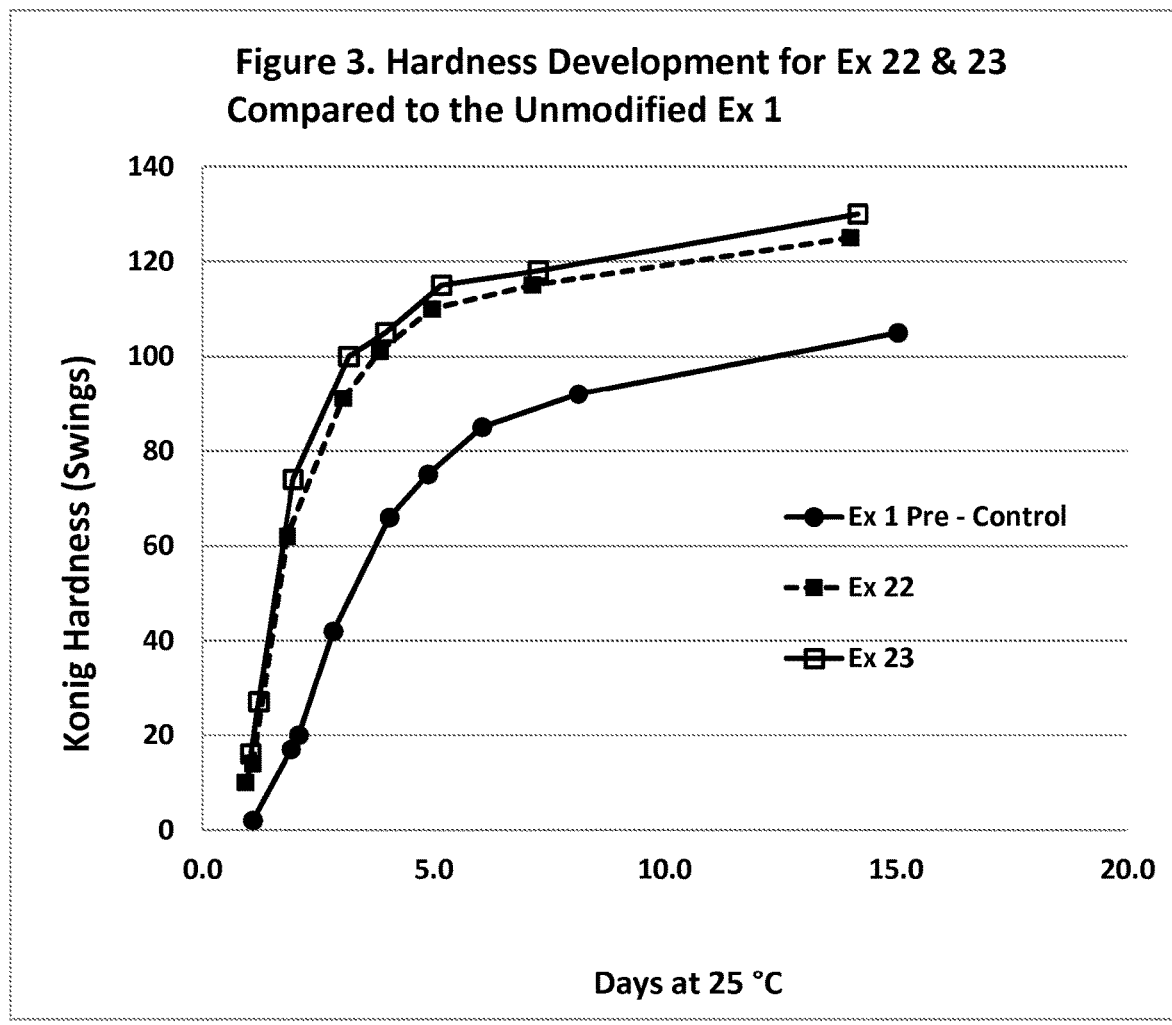

PHOSPHATE ESTER-MODIFIED ACRYLIC POLYOLS

CROSS-REFERENCE TO RELATED APPLICATIONS

This application is a U.S. National Phase Application under 35 U.S.C. § 371 of International Application No. PCT/US2015/054442, filed on Oct. 7, 2015, which claims the benefit of U.S. Provisional Patent Application No. 62/061,558, filed on Oct. 8, 2014, the entire disclosure of which is incorporated herein by reference for any and all purposes.

FIELD

The present technology is generally related to phosphate ester-modified acrylic polyol resins for extended pot-life and improved adhesion.

BACKGROUND

Acrylic polyols are often reacted with aliphatic isocyanates to yield high-performance two-pack urethane coatings. Simple mixing of a polyol with an aliphatic isocyanate has reaction kinetics that are too slow for most ambient cure applications. Accordingly, such reactions are accelerated by the use of active catalysts, particularly organotin catalyst that accelerate the reaction enough that the desired rate of ambient cure can be achieved.

As may be expected, increasing the catalyst amounts leads to speedier cure; however this comes at the expense of work time, or pot-life, of the two-pack coating. By increasing the cure rates, the workable life of the formulated package is reduced. Accordingly, tin-catalyzed, two-pack urethane systems are formulated so as to strike a balance between cure rate and pot-life for the application of interest as determined by those skilled in the art.

The high-performance coatings industry is constantly looking for methods to improve the extension of pot-life, while obtaining enhanced cure rates. Dilution with additional solvent is one possibility, but this unfavorably contributes more VOC, and moreover, would eventually result in too low of a viscosity. One manner of achieving an altered balance of cure rate and pot-life is through the use of tertiary amines to provide the catalyst effect instead of an organotin catalyst. While generally inferior due to a much lower catalytic activity (tertiary amine systems require many fold more on a weight basis weight basis than organotin), similar pot-life may be achieved. Furthermore, the tertiary amine systems are more water sensitive and in high humidity situations, the cure may be negatively influenced.

SUMMARY

In one aspect, a composition is provided including a phosphate-ester-modified acrylic polyol, where the effective amount of $(HPO_3)$ on acrylic polyol is greater than zero, but less than 1.0 wt %. This modification may be obtained by post-reacting the acrylic polyol with polyphosphoric acid (Scheme 1) or alternatively, via the use of phosphate modified acrylic monomer (e.g., HEMA-phosphate; hydroxyethylmethacrylate-phosphate). In some embodiments, the total modification (effective $HPO_3$) is less than 0.5 wt %. In some embodiments, the effective $HPO_3$ is less than 0.3 wt %. In other embodiments, the modification is less than 0.2 wt %. The composition may further include an isocyanate. Where the composition includes an isocyanate, the composition may exhibit a pot-life that is several times longer than a two part system at normal catalysts levels. Importantly, this enables the use of much higher catalysts levels, and upon application, accelerated cure is obtained. This may include a pot-life that is longer than a composition including an isocyanate and an acrylic polyol that has not been modified with polyphosphoric acid. Moreover, the use of these in-pot retarding phosphate acid moieties also has the beneficial effect of greatly improving adhesion.

As used herein, "less than [number] wt % modification by polyphosphoric acid means that the polyphosphoric acid-modified acrylic polyol contains less than [number] wt % phosphoric acid residues. For example, the modification of the acrylic polyol may be conducted by adding 1.0 wt % or less of polyphosphoric acid to the acrylic polyol. In some embodiments, 0.5 wt % or less polyphosphoric acid is added to the acrylic polyol. The polyphosphoric acid effectively makes a phosphate ester moiety on the acrylic polyol (see Scheme 1, below). Depending on the degree of esterification there will be acid groups present.

In another aspect, a two-component coating package is provided. The two-component package may include a first component including an isocyanate, and a second component that includes a phosphate ester-modified acrylic polyol, where the phosphate ester-modified acrylic polyol has greater than zero, but less than 1.0 wt % effective $HPO_3$ modification. In some embodiments, the effective $HPO_3$ modification is less than 0.5 wt %. In such embodiments, the isocyanate may include diphenyl diisocyanate, the trimer or isocyanurate of 1,6-hexamethylenediisocyanate, isophorone diisocyanate, 2,4-toluene diisocyanate, 2,6-toluene diisocyanate, methylene bis-cyclohexyldiisocyanate, naphthalene diisocyanate, or a mixture of any two or more thereof.

In another aspect, a process is provided for preparing a phosphate ester-modified acrylic polyol. In one process, this includes providing an acrylic polyol in a solvent and adding up to 1.0 wt % of polyphosphoric acid based on the acrylic polyol. In some embodiments, less than 0.5 wt % of polyphosphoric acid is added.

In another aspect, a process is provided for phosphate incorporation via direct polymerization of a phosphate ester monomer, such as HEMA-phosphate, to the acrylic polyol backbone.

In another aspect, a process is provided for preparing a phosphated polyol, e.g. a stock polyol, at higher phosphate modification, and using it as a blending agent with an unmodified polyol.

In another aspect, a coated substrate is provided including a film adhered to and coating at least a portion of a substrate. The film includes the reaction product of an isocyanate, a catalyst, and a phosphate ester-modified acrylic polyol, where the phosphate ester-modified acrylic polyol has greater than zero, but less than 1.0 wt % modification. In any such embodiment, the substrate may be various metal surfaces, glass, ceramic, wood, cement, plastic, paper, or cardboard.

BRIEF DESCRIPTION OF THE DRAWINGS

FIG. 1 is a graph of color versus for phosphate modification level, expressed in terms of the % of hydroxyls modified, for the freshly prepared cuts of phosphate-modified acrylic polyol (Ex 1-3), as well as those solutions aged after 1 year.

FIG. 2 is a graph of the gel times for various mixtures of the PPA-modified polyols (three levels of modification and a control) with isocyanate curing agent and with varying levels of dibutyltindilaurate catalyst DBTDL (expressed in parts per ten-thousand solids).

FIG. 3 is a graph of the hardness development for Examples 22 and 23 compared to the unmodified Example 1.

DETAILED DESCRIPTION

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 30% of the particular term.

Solvent-borne, two-component, acrylic polyol-isocyanate cured coating materials are described that exhibit improved pot-life with low in-can color. Cured films of the acrylic polyol-isocyanate-cured coatings show improved adhesion and color retention. The improvements are due to modification of the acrylic polyol with low levels of polyphosphoric acid (PPA), to produce acrylic polyols having low amounts of monophosphate ester linkages. The overall level of modification can be less than 0.5 wt %, with key improvements in low color, adhesion and fast cure.

In one aspect, a composition is provided that includes a phosphate ester-modified acrylic polyol. The phosphate ester-modified acrylic polyol includes greater than zero, but less than 1.0 wt % modification with polyphosphoric acid. In some embodiments, the phosphate ester-modified acrylic polyol includes greater than zero, but less than 0.5 wt % modification with polyphosphoric acid. Without being bound by theory, it is believed that the low level of phosphorylation, effectively phosphorylates some of the hydroxyls on the acrylic polyols, presumably as monoester phosphates as shown in Scheme 1 (illustrating a single phosphorylation of a single alcohol site of the acrylic polyol). Originally intended to serve as an adhesion booster, which it certainly does, it has been found that very low modification levels of the acrylic polyol with phosphate act to suppress the catalysis imparted by curing catalysts, such as tin, bismuth, zirconium, octaoate, or dionate catalysts. This, in turn, enables much higher doping with the catalyst. The result is a system with extended pot-life, but upon application and exposure to air as a film, rapid cure of the coating. Another benefit of the polyphosphoric acid-modified acrylic polyol is that less "in-can color" is observed when compared to typical tertiary amine containing systems.

Scheme 1

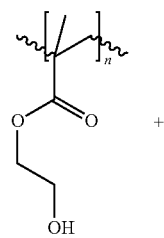

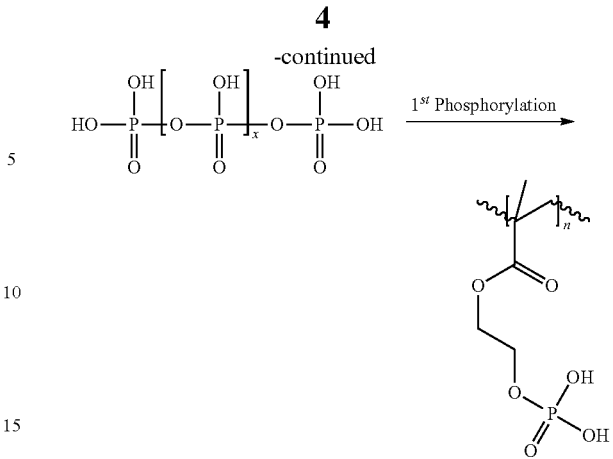

In some embodiments of the composition, the phosphate ester-modified acrylic polyol may have greater than zero, but less than 0.3 wt % modification with polyphosphoric acid. In other embodiments, the polyphosphoric acid-modified acrylic polyol may have greater than zero, but less than 0.2 wt % modification with polyphosphoric acid.

In another aspect, a composition is provided that includes the reaction product of an acrylic polyol with X wt % phosphate ester modification, based upon the acrylic polyol solids, wherein $0<X\leq 0.5$. In some embodiments, $0<X\leq 0.3$, while in other embodiments, $0<X\leq 0.2$. In further embodiments, $0<X\leq 1$. This includes from 0.01 to 1, from 0.01 to 0.5, from 0.01 to 0.3, and from 0.01 to 0.2.

In any of the above compositions, the acrylic polyol may include the reaction product of an acrylic, methacrylic, or styrenic monomer, as well as a mixture of any two or more thereof, and a hydroxylated acrylic or hydroxylated methacrylic monomer, allyl alcohol, or mixture of any two or more thereof. Illustrative (meth)acrylic monomers include, but are not limited to, (meth)acrylic acid, methyl (meth)acrylate, ethyl (meth)acrylate, n-propyl (meth)acrylate, n-butyl (meth) acrylate, isopropyl (meth)acrylate, isobutyl (meth)acrylate, isobornyl (meth)acrylate, cyclohexyl (meth)acrylate, and 2-ethylhexyl (meth)acrylate. Illustrative styrenic monomers include, but are not limited to, styrene and α-methylstyrene. Mixtures of any two more acrylic monomers, methacrylic monomers, or styrenic monomers may also be used. Necessary hydroxyl functionality is supplied by hydroxylated acrylic or hydroxylated methacrylic monomers, or even allyl alcohol. Examples of hydroxy-functional (meth)acrylates include, but are not limited to, 2-hydroxyethyl acrylate, 2-hydroxyethyl methacrylate, hydroxypropyl acrylate, hydroxypropyl methacrylate, and hydroxybutyl acrylate.

In any of the above compositions, the acrylic polyol may also include a residue of an initiator used in the reaction of the acrylic, methacrylic, or styrenic monomer, or a mixture of any two or more thereof, with the hydroxylated acrylic or methacrylic monomer, or mixture of any two or more thereof. Such reactions to form the acrylic polyols may be facilitated by use of an initiator. While the initiator may survive the reaction, and any subsequent workup of the reaction, the initiator may also be partially or completely spent thereby producing a residue. Typical initiators are dialkyl peroxides such as di-t-amyl peroxide, di-t-butyl peroxide, alkyl peroxy esters such as t-amyl peroxyacetate, t-butyl peroxyesters, and any of the various VAZO® initiators, which are free radical, azo-based initiators available from DuPont.

Any of the above compositions may further be combined with an isocyanate and a catalyst to form a curable composition. The curable composition, with the presence of the phosphoric acid-modified acrylic polyol, isocyanate, and catalyst will begin the curing process. However, the composition should also be workable over a reasonable time period, which is referred to as the pot-life.

Illustrative isocyanates for use in the composition include any isocyanates known for formation of polyurethanes. For example this includes, but is not limited to, diphenyl diisocyanate, 1,6-hexamethylenediisocyanate (HDI), isophorone diisocyanate and its trimer (e.g. IT-170 B available from BASF), 2,4-toluene diisocyanate, 2,6-toluene diisocyanate, methylene diphenyl diisocyanate (MDI), polymeric MDIs, methylene bis-cyclohexyldiisocyanate, naphthalene diisocyanate, hydrogenated methylene diphenyl diisocyanate (e.g. H12MDI), or a mixture of any two or more thereof. All aliphatic isocyanates based on HDI including its trimer (e.g. HI-100 available from BASF or Desmodur N3300 available Bayer) and other oligomers based on HDI-isocyanurate, allophanates (e.g. HA-100 available from BASF) and biurets (e.g. HB-100 available from BASF or Desmodur N3200 available from Bayer) based on HDI, and similar products based on isophorone diisocyanate or hydrogenated diphenyldiisocyanate methane.

The catalyst may generally be an organobismuth catalyst, organozirconium catalyst, an organotin catalyst, a metal octoate catalyst, a metal dionate catalyst, or a mixture of any two or more thereof. Illustrative catalysts include, but are not limited to, triphenylbismuth, dibutyltindilaurate, dibutyltindiacetate, dioctyltindilaurate, zinc octoate, tin ocoate, zirconium dionate and cobalt dionate.

Once the isocyanate, phosphate ester-modified acrylic polyol, and catalyst are combined, the composition may exhibit a pot-life of at least 15 minutes. Although there are several definitions for pot-life, a simple approximation of pot-life is the time it takes for the initial formulated viscosity, a measured upon mixing of the components, to double in value as the curing progresses. By way of comparison, the composition of the isocyanate, phosphate ester-modified acrylic polyol, and catalyst, may exhibit a longer pot-life than a composition that includes the reaction product of an acrylic polyol unmodified with polyphosphoric acid.

Any of the above compositions may further include a solvent for dilution, suspension, or dissolution of the phosphate ester-modified acrylic polyol, isocyanate, and other components of the composition. The solvent should be effective for the various components, but have a sufficient vapor pressure that it may evaporate from a film of the composition when applied to a substrate. Illustrative solvents include, but are not limited to methyl isobutyl ketone, methyl amyl ketone, n-butyl acetate and other acetate, or xylenes or other aromatic solvents.

In another aspect, a two-component coating package is provided. Such a package may include a first component that includes an isocyanate; and a second component that includes a phosphate ester-modified acrylic polyol, wherein the phosphate ester-modified acrylic polyol has greater than zero, but less than 1.0 wt % phosphate ester modification. The isocyanate and phosphate ester-modified acrylic polyol may be any of those as described herein. As above, the phosphate ester-modified acrylic polyol includes greater than zero, but less than 0.5 wt % phosphate ester modification, in some embodiments. In other embodiments, the phosphate ester-modified acrylic polyol includes greater than zero, but less than 0.3 wt % phosphate ester modification. In yet other embodiments, the phosphate ester-modified acrylic polyol may include greater than zero, but less than 0.2 wt % phosphate ester modification.

In another aspect, a process is provided for preparing a phosphate ester-modified acrylic polyol. The process includes providing an acrylic polyol in a solvent, and adding up to 1.0 wt %, based on the acrylic polyol, of a polyphosphoric acid. In some embodiments, up to 0.5 wt % of a polyphosphoric acid is added to the acrylic polyol. The amount of acrylic polyol relative to the solvent may be adjusted to maintain good stirring properties as the reaction proceeds or to achieve appropriate reaction kinetics. In general the acrylic polyol is provided in the solvent from about 20 wt % to about 90 wt %. In some embodiments, the acrylic polyol is provided in the solvent from about 50 wt % to about 80 wt %. Illustrative solvents include, but are not limited to methylisobutylketone, methylamylketone, and common esters like butyl acetate.

The acrylic polyol may be any of the acrylic polyols described herein. The amount of polyphosphoric acid added to the acrylic polyol may be from 0.01 wt % up to 1.0 wt %, based upon the amount of acrylic polyol. In some embodiments, the amount of polyphosphoric acid added is from 0.01 wt % up to about 0.5 wt %. In some embodiments, the amount of polyphosphoric acid added is from 0.01 wt % up to about 0.3 wt %. In other embodiments, the amount of polyphosphoric acid added is from 0.01 wt % up to about 0.2 wt %.

In another aspect, a process is provided for preparing a phosphate polyol, e.g. a stock polyol, at higher phosphate modification, and using it as a blending agent with unmodified polyol. Additional solvent may be necessary to bring the viscosity back into the ideal range. Accordingly, despite the above limitations on wt % phosphate ester modification, a process is provided for preparing a stock phosphate ester-modified acrylic polyol by adding up to 10 wt %, based on the acrylic polyol, of polyphosphoric acid to an unmodified acrylic to form the stock phosphate ester-modified acrylic polyol. The stock phosphate ester-modified acrylic polyol may then be diluted further with solvent, and by mixing with unmodified acrylic polyol to achieve an effective loading of phosphate in the overall acrylic formula to the ideal range of less than 1.0 wt %. In some embodiments, the effective loading of the phosphate in the resulting combination is less than 0.5 wt %. In some embodiments, the effective loading of the phosphate in the resulting combination is less than 0.3 wt %. In some embodiments, the effective loading of the phosphate in the resulting combination is less than 0.2 wt %. In some embodiments, the effective loading of the phosphate in the resulting combination is from 0.01 wt % to 0.5 wt %, or from 0.01 wt % to 0.2 wt %.

Where the stock phosphate ester-modified acrylic polyol is diluted with a solvent, it may be any of the solvents listed for the phosphate ester-modified polyol. Such solvents include, but are not limited to, methylisobutylketone, methylamylketone, n-butyl acetate and other acetates, as well as xylene and other aromatics.

Where the stock phosphate ester-modified acrylic polyol is diluted with a non-phosphate ester-modified acrylic polyol solvent, it may be any acrylic polyol. In one embodiment, the non-phosphate ester-modified acrylic polyol is the acrylic polyol.

In another aspect, a process is provided for phosphate incorporation via direct polymerization of a phosphate ester monomer to the acrylic polyol backbone. Accordingly, instead of preparing an acrylic polyol and then post-modifying it with the phosphate ester, the acrylic polyol may be directed prepared using monomers having phosphate ester functionality.

According, a process for preparing a phosphate ester-modified acrylic polyol may include, mixing a phosphate ester-modified monomer with an acrylic, methacrylic, and/or styrenic monomer, with a hydroxylated acrylic, hydroxylated methacrylic monomer, allyl alcohol monomer, or a mixture of any two or more thereof, in a solvent; and polymerizing the monomers to form the phosphate ester-modified acrylic polyol. The, optional, additional amount(s) of hydroxylated acrylic, hydroxylated methacrylic monomer, and allyl alcohol monomer, effectively dilute the amount of the phosphate ester-modified monomer to achieve the low modification amounts described above. The polymerization process may follow other known processes for forming acrylic polyols, however with the phosphate ester modified-monomer, the phosphate ester functionality is incorporated directly into the acrylic polyol as the resin is prepared. For example, the process may include the use of 2-hydroxyethylmethacrylate phosphate.

In another aspect, a coated substrate is provided. The substrate is at least partially coated with a film containing a polyurethane. The polyurethane is formed by the reaction of an isocyanate, a catalyst, and a phosphate ester-modified acrylic polyol. The phosphate ester-modified acrylic polyols are those as are described herein.

The isocyanate used in the films and film formation are those as are known in the art of preparing polyurethanes, and are as named above, and may include, but are not limited to, diphenyl diisocyanate, 1,6-hexamethylenediisocyanate, isophorone diisocyanate, 2,4-toluene diisocyanate, 2,6-toluene diisocyanate, methylene bis-cyclohexyldiisocyanate, naphthalene diisocyanate, or a mixture of any two or more thereof. The catalyst used in the films and the formation of the films may be an organotin or organobismuth catalyst. Illustrative catalysts include, but are not limited to, triphenyl bismuth, dibutytindilaurate, dioctyltindilaurate.

The substrate coated with the film may be any surface or material to which a polyurethane coating would be applied. This may include, but is not limited to, glass, ceramic, wood, cement, plastic, paper, or cardboard.

The present invention, thus generally described, will be understood more readily by reference to the following examples, which are provided by way of illustration and are not intended to be limiting of the present invention.

EXAMPLES

Examples 1-3

Phosphorylation of an acrylic polyol (samples 1-3). An acrylic polyol, 300.0 g, with an equivalent weight of 394 g and at 80% solids in methylamyl ketone (MAK), and with a number average molecular weight ($M_n$) of 1350 Daltons, was further cut with 125.0 g (MAK) to make a 60% cut. 1.38 g of polyphosphoric acid ("PPA;" Sigma-Aldrich) was added to form a first sample. The mixture was held for 1 hr at 70° C. under agitation. The polyphosphoric acid was therefore added at about 0.46% by weight, based upon the acrylic polyol. The initial APHA color of this cut was 46.

After setting aside an aliquot of the first sample, the remainder was diluted by 50% with additional amount of the acrylic polyol/MAK cut, forming a second sample. After setting aside an aliquot of the second sample, the remainder was then diluted by 50% with additional MAK to form a third sample. The first, second, and third samples thus contained 0.46, 0.23 and 0.12 wt %, respectively of PPA based upon the acrylic polyol.

After addition of the polyphosphoric acid to the acrylic polyol, the hydroxyl number of the resin portion is estimated at 139.5, 140.9, and 141.7, respectively. This assumes the starting acrylic polyol has a hydroxyl equivalent weight of 394 g and hydroxyl number of 142.4. There is a corresponding increase in acid level (AV), as the acid number goes from 0 (in the neat acrylic polyol), to 1.7, 3.4, and 6.9, respectively for the three levels of phosphate addition. A summary of the products is given in Table 1.

TABLE 1

Formulations for Phosphorylated Polyol Composition

| Example | Mass (g) | | | | Solids | | mg KOH/g dry | | |
|---|---|---|---|---|---|---|---|---|---|
| No. | Polyol | MAK | PPA | Total | Resin | Total | AV | OH | % PPA |
| 1 | 300.0 | 200.0 | 1.38 | 501.4 | 0.598 | 0.601 | 6.9 | 139.5 | 0.46 |
| 2 | 300.0 | 200.0 | 0.69 | 500.7 | 0.599 | 0.601 | 3.4 | 140.9 | 0.23 |
| 3 | 300.0 | 200.0 | 0.35 | 500.3 | 0.600 | 0.600 | 1.7 | 141.7 | 0.11 |

Color.

The color of the modified resin cuts (Ex 1-3) were compared to the platinum-cobalt (PtCo, ASTM-1209 or APHA) scale. The color was checked at the time of initial preparation, and after 1 year of aging. The solids were previously reported for the tested resin solutions (Table 1). A value of 50 or less is considered ideal. While there is some increase in color over time, after a full year the mid-point still is under 50 APHA (also called the Hazen scale). Some common fast-cure-based systems typically have an initial Pt-Co color of about 40, but can rise quickly over time to 100 or more, depending on heat and aging. For instance, if the liquor is held at 48° C., the amine-based systems will discolor to about 95 APHA after 20 days, which approximates about 4 to 6 months at room-temperature. During the course of the year, the 0.46% PPA modified sample (Example 1) went from 47 to 71 APHA. The whole range of APHA color trends is illustrated in FIG. 1 for Examples 1-3.

Examples 4-18: Formulation with Isocyanate Cross-Linker in Pot-Life/Gel-Time Test Each resin cut in MAK was mixed with 1,3,5-tris(6-isocyanatohexyl)-1,3,5-triazine-2,4,6(1H,3H,5H)-trione ("HDI trimer") at a ratio of 1.0 (OH):1.05 (NCO) on equivalence assuming the original hydroxyl number of 142.4 for the solids. No compensation was made for the small amount of acid in terms of the isocyanate groups of the HDI. These mixtures were evaluated for gel-time at several levels of tin (DBTDL) catalyst (Table 2). The level of catalyst is expressed in parts of DBTDL per ten-thousand solids. The appropriate amount of tin (DBTDL) is added to the polyol prior to addition of the NCO. These are simple clear-coat formulas, containing no other additives, such as pigments and levelling aids, for the simple purpose of illustrating the type of technology. Only polyol, modified with phosphate, solvent, catalyst and isocyanate cross-linker are used.

Gel time is used as a crude measure of pot-life. This may be done because the time it takes to double in viscosity—another measure of pot-life—is typically ⅔ of the gel time. Thus, this measurement scales yielding the desired information. Without any phosphate or tin (Ex 16), the acrylic polyol in MAK takes 90-100 hours to gel with the requisite NCO, varying slightly depending on the exact solids used and ambient temperature. Use of 0.01 pHR DBTDL (Ex 17) on the acrylic polyol will decrease the gel-time to about 3 hours, which is consistent with the observed viscosity doubling time of ~about 120 minutes. At high levels of DBTDL addition (Ex 18), very short gel-times are observed. For example, a gel time of 13.5 minutes is obtained for a DBTDL level of 0.1 pHS and no phosphate. Even at the lowest phosphate modification level, gel-times of about 7 hours were obtained with such high levels of tin (Ex 10-12). The gel-times for all of the formulations are summarized in Table 2, with time zero occurring upon mixing with the HDI-trimer. Importantly, this table shows the significant retarding effect on the in-the-pot cure profile by modification of the polyol.

TABLE 2

Gel Times and Formulations

| Example No. | Wt % PPA in Example 1-3 | DBTDL PPTS* | Wt % Solids | NCO/ (OH + H) | Gel Time (hours) |
|---|---|---|---|---|---|
| 4 | 0.46 | 6.1 | 63.3 | 1.02 | 18.0 |
| 5 | 0.46 | 9.1 | 62.2 | 1.02 | 15.5 |
| 6 | 0.46 | 12.1 | 61.0 | 1.02 | 14.5 |
| 7 | 0.23 | 6.0 | 71.4 | 1.05 | 13.5 |
| 8 | 0.23 | 9.0 | 69.9 | 1.05 | 10.8 |
| 9 | 0.23 | 12.0 | 68.5 | 1.05 | 10.4 |
| 10 | 0.11 | 6.0 | 76.3 | 1.06 | 7.2 |
| 11 | 0.11 | 9.0 | 74.6 | 1.06 | 6.8 |
| 12 | 0.11 | 12.0 | 73.0 | 1.06 | 6.4 |
| 13 | 0.46 | 1.0 | 64.9 | 1.02 | 27.5 |
| 14 | 0.46 | 2.0 | 64.7 | 1.02 | 25.5 |
| 15 | 0.46 | 3.0 | 64.4 | 1.02 | 22.0 |
| 16 | 0 | 0.0 | 70.0 | 1.05 | 98.0 |
| 17 | 0 | 1.0 | 70.0 | 1.05 | 3.0 |
| 18 | 0 | 10.0 | 69.9 | 1.05 | 0.22 |

This data is also illustrated in FIG. 2. The control series (squares, 0% PPA), for the acrylic polyol has gel times ranging from the exceptionally long of 100 hours to 13 minutes for 0.1 pHS (a very high level). The first point is obviously unrealistic for ambient cure and shows why a catalyst is needed. The second (mid-point), with a 3 hour gel-time is close to the optimal tin level, while the last point (0.1 pHS) reacts so fast, that it is unusable in terms of pot life (once applied, theoretically, its film will develop properties the fastest). For all three levels of PPA modification, there is tremendous pot-life extension. Moreover, the rate of gelation is comparatively independent of catalyst level. It is contemplated that such formulations could be doped with even higher levels of DBTDL, if desired.

Cure of the Coating/Film.

Further examples were conducted to determine whether the retarding effect takes place outside of the pot, e.g. when a developing film is curing. After a short induction period, films from (Ex-4-15, excluding Ex. 13) were cast onto a metal (Al) substrate. Developing films (about 30 microns, 1.5 mils) were typically monitored for dry times, Konig (Pendulum) hardness development, adhesion, and chemical resistance.

Konig Hardness.

The Konig hardness development for films from the series of points done at 6, 9, and 12 parts per ten-thousand (pTTS) of DBTDL, as shown in Table 3. After one day of ambient cure (typically 22-25° C.), the films yield Konig swings of from 15 to 30, generally. The values "measured" after 1 day of cure may vary significantly, depending on whether the reading is taken at 20 hours of actual cure time, on the short side, or 28 hours, on the long side. Within each series, e.g. at the 0.12% PPA level, the Konig measurement times are the same. Thus, there is a clear correlation with one-day hardness and tin level. We expect that increased levels of PPA lead to greater retardation, which is captured in going from 0.12% to 0.23% PPA. A developing control film, such as that from Ex 17 will typically yield only 5 Konig swings after 1 day.

TABLE 3

Konig Pendulum Hardness for approx. 1.2 mm Films as a Function of Ambient Cure Time

| Wt % PPA on Examples | Konig Hardness Development (Swings) | | | | | | | | |
|---|---|---|---|---|---|---|---|---|---|
| | 0.06 pHS* | | | 0.09 pHS* | | | 0.12 pHS* | | |
| 1-3 | Ex. # | 1 day | 7 day | Ex. # | 1 day | 7 day | Ex. # | 1 day | 7 day |
| 0.12 | 10 | 20 | 94 | 11 | 28 | 91 | 12 | 33 | 94 |
| 0.23 | 7 | 22 | 98 | 8 | 23 | 89 | 9 | 29 | 95 |
| 0.46 | 4 | 25 | 83 | 5 | 30 | 83 | 6 | 35 | 75 |

*pHS is parts of DBTDL per hundred solids in the formulation

After one week of cure, Konig swings in the 90 to 100 range were obtained for the two lower PPA modification levels. This is consistent with the fully cured acrylic control polyol, which typically exhibits Konig swings of 95 to 105. This film takes between 20 and 30 days to develop its full complement of hardness. There does appear to be some retardation of cure at 0.46% PPA in terms of final Konig hardness. This may be due to some of the water reaction, or possibly a result of the lower indexing level (1.02 per Table 1).

Both early and final hardnesses were measured. Early hardness means faster initial cure, and less time that the surface is tacky. Final hardness is not only important for scratch resistance, but generally indicates a better developed network and chemical resistance.

Adhesion.

A cursory check for improved adhesion was made on some cured formulations. Here, the films (1.5 mils DFT) were cast on bare aluminum and ambient cured for at least 7-days. The X-scribe test was used according to ASTM D3359 (1 hour water spot on an X mark scribed into the film). A control panel, consisting of the acrylic polyol cured with HDI trimer and DBTDL catalyst, failed the wet-adhesion test. Panels from the 0.23% PPA modified acrylic polyol cured at all three DBTDL catalyst levels (Exs. 7 to 9) easily passed the wet-adhesion test. In a more severe adhesion test, the film (Ex. 8) prepared at 0.23% PPA modification and 0.09 pHS DBTDL rated a 4B after a 4-day soak/30 minute dry time and cross-hatch/tape pull. It is believe that the higher levels of phosphate modification will be more important and useful for the more severe adhesion cases.

Chemical Resistance.

The chemical resistance was evaluated for fully ambient cured films from formulations (Exs. 4 to 12, Table 1) using MEK (methyl ethyl ketone) double rubs. Each film easily passed 200 double-rubs with no breakthrough; moreover, there was essentially no damage to the surface of the coatings as indicated by the unaffected gloss.

Pot Life.

A "real pot-life" study (Exs. 19 to 21) was conducted on a single point formula. Here, a PPA modification level of 0.23% with 10 pTTS of DBTDL was used. An approximate 10% excess of NCO on reactive H was used in the mix. The primary purpose here was to obtain, as realistically as possible, if true pot-life extension was achieved using the phosphorylation chemistry. In other words, not only does the pot viscosity remain low, but do films applied at different induction times develop with similar and undiminished final properties. Thus, the above mixture was applied at 15 (Ex 19), 135 (Ex 20), and 285 (Ex 21) minutes induction to bare aluminum panels using a 5-mil gate applicator. A 5-mil gate applicator typically applies a 2.5 mil wet (i.e. t=0 thickness), which at 70% solids, yields a dry film thickness of 1.5 mils DFT mm. Final hardness and chemical resistance were determined.

Table 4 shows the hardness development measured at several stages of cure (25° C., 50% relative humidity). For the first two induction periods, these panels were able to develop a tack-free feel before the end of the day (about 6 hours after formulation, t=0), and as expected yielded low swings. On the third day, the panels were cut in half and measured for hardness, yielding about 80, 70, and 57 swings for the three induction periods. The top-half of each panel was baked for 90 minutes at 90° C. The final hardness for all panels was about 110 swings.

The hardness development for the other ambient cure half of each panel was tracked. Even after 10 days, the longer induction panels showed some Konig suppression, especially for the 4.75 hour film. A theory was developed that this was due to a slightly higher level of trapped MAK solvent in the film—a result of its late application, and quick post-application cure. All three films were then heated at 70° C. overnight. The Konig values were re-measured a week later after being in the CTHR from days 11-18, with all panels exhibiting 100-105 swings. This supports the hypothesis that the low Konig values were not the result of an improperly developed network, but of some trapped MAK. It is important to note that the MAK is anticipated to diffuse out over time.

TABLE 4

Konig Hardness for Developing Films of Different Inductions

| Konig @ days | Ex. 19 | Ex. 20 | Ex. 21 | Comment |
|---|---|---|---|---|
| | 0.25 | 2.25 | 4.75 | |
| | Induction Period (hours) | | | |
| 0.25 | 3 | 2 | nm* | Ambient Cure |
| 3 | 81 | 70 | 57 | |
| 5 | 97 | 87 | 71 | |
| 10 | 107 | 99 | 81 | Baked @ 70° C. |
| 18 | 103 | 103 | 99 | Next reading |
| Different conditions and sample time. See comments | | | | |
| 0.25 | 3 | 2 | nm* | Pre-bake |
| 3 | 80 | 69 | 57 | |

TABLE 4-continued

Konig Hardness for Developing Films of Different Inductions

| Konig @ days | Ex. 19 | Ex. 20 | Ex. 21 | Comment |
|---|---|---|---|---|
| | 0.25 | 2.25 | 4.75 | |
| | Induction Period (hours) | | | |
| 3 | 100 | 99 | 97 | Post Bake 90 min @ 90° C. |
| 5 | 109 | 110 | 108 | Next reading |
| 10 | 110 | 111 | 109 | Final reading |

*nm means not measured

Example 22

Pot-life Extension Using a Phosphate Monomer. In this study, the use of "HEMA-phosphate" monomer (2-hydroxyethyl methacrylate phosphate) was demonstrated for the purposes of this invention. The phosphate monomer was polymerized in a CSTR (continuous stirred-tank reactor) at high temperatures along with other standard acrylic monomers to produce a polyol with a low level of phosphate modification. Molecular weight was controlled in a way to produce something comparable to the starting polyol used in make Example 1 (also the polyol from Exs 16-18). The level of HEMA-phosphate on total resins solids was at 0.65% and 0.98%, for the two examples, Examples 22 and 23, respectively. This value corresponds to an effective PPA (polyphosphoric acid) modification level of 0.22 and 0.33%, respectively. A basic description of the resins is provided in Table 5.

TABLE 5

| | Example 1-Pre | Ex. 22 | Ex. 23 |
|---|---|---|---|
| Mod Level | None | Lo | Hi |
| Mn | 1360 | 1440 | 1460 |
| Mw | 2520 | 2800 | 2920 |
| OH No. | 141 | 140 | 140 |
| % HEMA-Phos | 0.0% | 0.65% | 0.98% |
| % PPA Eq | | 0.22% | 0.33% |
| AV (Phosphate Theo) | 0 | 3 | 5 |

The above resins were cut in solvent and formulated with the standard isocyanate cross-linker, HDI-trimer. All formulations were adjusted to ~80-100 cPs with solvent, corresponding to about 65% non-volatiles. The tin catalyst, dibutyltin dilaurate (DBTDL) was added in order to obtain an approximate 2-hour pot-life. The requisite amount of DBTDL needed to obtain the desired pot-life was ~0.60, 2.5, and 4.4 pTTS (parts of DBTDL per ten-thousand parts of total polymer solids).

The formulation was applied to a metal substrate in order to obtain roughly 1.3 mils dry-film thickness. The coating was allowed to cure at room-temperature and hardness development was followed for the next two weeks. The results are shown in FIG. 3. Ex 22 and Ex 23 end up being slightly harder films (125 vs 105 swings), which could in part be due to the slightly higher Mn for the illustrative examples. Nonetheless, the increase in early hardness development is particularly noteworthy, and shows that early hardness was achieved at equivalent pot-life.

The examples show that an acrylic polyol modified with polyphosphoric acid at low levels offers improved adhesion, true latent behavior of long pot-life with fast cure, and low in-can color.

ILLUSTRATIVE EMBODIMENTS

The following lettered paragraphs ("Para.") are provided to illustrate some non-limiting embodiments of the present application.

Para. 1. A composition includes a phosphate ester-modified acrylic polyol, wherein the phosphate ester-modified acrylic polyol includes greater than zero, but less than 1.0 wt % phosphate modification.

Para. B. The composition of Para. 1, wherein the phosphate ester-modified acrylic polyol includes greater than zero, but less than 0.5 wt %, 0.3 wt %, or 0.2 wt %, depending upon the embodiment, of phosphate modification.

Para. C. A composition includes the reaction product of an acrylic polyol and X wt % polyphosphoric acid, based upon the acrylic polyol, wherein 0.01≤X≤1.0.

Para. D. The composition of Para. C, wherein 0.01≤X≤0.5, or wherein 0.01≤X≤0.2.

Para. E. The composition of any one of Paras. A-D, wherein the acrylic polyol includes the reaction product of an acrylic, methacrylic, or styrenic monomer, or a mixture of any two or more thereof, and a hydroxylated acrylic, hydroxylated methacrylic monomer, allyl alcohol monomer, or mixture of any two or more thereof.

Para. F. The composition of Para E, wherein the acrylic, methacrylic, or styrenic monomer includes acrylic acid, methacrylic acid, methyl methacrylate, ethyl acrylate, ethyl methacrylate, n-propyl acrylate, n-propyl methacrylate, n-butyl acrylate, n-butyl methacrylate, isopropyl acrylate, isopropyl methacrylate, isobutyl acrylate, isobutyl methacrylate, n-amyl acrylate, n-amyl methacrylate, n-hexyl acrylate, n-hexyl methacrylate, isoamyl acrylate, isoamyl methacrylate, trifluoroethyl acrylate, trifluoroethyl methacrylate, benzyl acrylate, benzyl methacrylate, 2-n-butoxyethyl acrylate, 2-n-butoxyethyl methacrylate, 2-chloroethyl acrylate, 2-chloroethyl methacrylate, sec-butyl acrylate, sec-butyl methacrylate, tert-butyl acrylate, tert-butyl methacrylate, 2-ethylbutyl acrylate, 2-ethylbutyl methacrylate, cinnamyl acrylate, cinnamyl methacrylate, cyclohexyl acrylate, cyclohexyl methacrylate, cyclopentyl acrylate, cyclopentyl methacrylate, 2-ethoxyethyl acrylate, 2-ethoxyethyl methacrylate, furfuryl acrylate, furfuryl methacrylate, hexafluoroisopropyl acrylate, hexafluoroisopropyl methacrylate, 3-methoxybutyl acrylate, 3-methoxybutyl methacrylate, 2-methoxybutyl acrylate, 2-methoxybutyl methacrylate, 2-nitro-2-methylpropyl acrylate, 2-nitro-2-methylpropyl methacrylate, n-octyl-acrylate, n-octyl-methacrylate, 2-ethylhexyl acrylate, 2-ethylhexyl methacrylate, 2-phenoxyethyl acrylate, 2-phenoxyethyl methacrylate, 2-phenylethyl acrylate, 2-phenylethyl methacrylate, phenyl acrylate, phenyl methacrylate, propargyl acrylate, propargyl methacrylate, tetrahydrofurfuryl acrylate, tetrahydrofurfuryl methacrylate, tetrahydropyranyl acrylate, tetrahydropyranyl methacrylate, styrene, or α-methylstyrene.

Para. G. The composition of Para. E or F, wherein the hydroxylated monomer includes acrylic or hydroxylated methacrylic monomer includes 2-hydroxyethyl acrylate, 2-hydroxyethyl methacrylate, 2-hydroxypropyl acrylate, 2-hydroxypropyl methacrylate, or allyl alcohol.

Para. H. The composition of Para. E, F, or G, wherein the reaction product further includes a residue of an initiator used in the reaction of the acrylic, methacrylic, or styrenic monomer, or a mixture of any two or more thereof, with the hydroxylated acrylic or methacrylic monomer or allyl alcohol, or mixture of any two or more thereof.

Para. I. The composition of Para. H, wherein the initiator is a dialkyl peroxide, an alkyl peroxy ester, or a free radical, azo-based initiator.

Para. J. The composition of any one of Paras. A-J further including an isocyanate.

Para. K. The composition of Para. J, wherein the isocyanate includes diphenyl diisocyanate, 1,6-hexamethylenediisocyanate, isophorone diisocyanate, a trimer of isophorone diisocyanate, 2,4-toluene diisocyanate, 2,6-toluene diisocyanate, methylene diphenyl diisocyanate, a polymeric methylene diphenyl diisocyanate, methylene bis-cyclohexyldiisocyanate, naphthalene diisocyanate, hydrogenated methylene diphenyl diisocyanate, a trimer of hexamethylenediisocyanate, an allophanate, a biuret, or a mixture of any two or more thereof.

Para. L. The composition of Para J or K further including a catalyst.

Para. M. The composition of Para. L, wherein the catalyst is an organotin, organobismuth, organozinc, a metal octoate, or a metal dionate catalyst.

Para. N. The composition of Para. L or M, wherein the catalyst is an organotin catalyst includes triphenylbismuth, dibutyltindilaurate, dibutyltindiacetate, dioctyltindilaurate, zinc octoate, tin ocoate, zirconium dionate, cobalt dionate, or a mixture of any two or more thereof.

Para. O. The composition of Para. L or M or N which exhibits a longer pot-life than a composition including the reaction product of a non-phosphate ester-modified acrylic polyol.

Para. P. The composition of any one of Paras. L-O which exhibits improved adhesion when compared to a composition including the reaction product of a non-phosphate ester-modified acrylic polyol.

Para. Q. A two-component coating package includes a first component including an isocyanate; and a second component including a polyphosphoric acid-modified acrylic polyol, wherein the polyphosphoric acid-modified acrylic polyol includes greater than zero, but less than 1.0 wt % modification by polyphosphoric acid.

Para. R. The two-component coating package of Para. Q, wherein the polyphosphoric acid-modified acrylic polyol includes greater than zero, but less than 0.5 wt % modification by polyphosphoric acid.

Para. S. The two-component coating package of Para. Q or R, wherein the polyphosphoric acid-modified acrylic polyol includes greater than zero, but less than 0.2 wt % modification by polyphosphoric acid.

Para. T. The two-component coating package of any one of Paras. Q-S, wherein the isocyanate includes diphenyl diisocyanate, 1,6-hexamethylenediisocyanate, isophorone diisocyanate, a trimer of isophorone diisocyanate, 2,4-toluene diisocyanate, 2,6-toluene diisocyanate, methylene diphenyl diisocyanate, a polymeric methylene diphenyl diisocyanate, methylene bis-cyclohexyldiisocyanate, naphthalene diisocyanate, hydrogenated methylene diphenyl diisocyanate, a trimer of hexamethylenediisocyanate, an allophanate, a biuret, or a mixture of any two or more thereof.

Para. U. The two-component coating package of any one of Paras. Q-T further including a catalyst in the first component, the second component, or both the first component and the second component.

Para. V. A process for preparing a phosphate ester-modified acrylic polyol, the process including providing an acrylic polyol in a solvent; and adding up to 1.0 wt %, based on the acrylic polyol, of a polyphosphoric acid.

Para. W. The process of Para. V including adding up to 0.5 wt %, based on the acrylic polyol, of a polyphosphoric acid.

Para. X. The process of Para. V or W, wherein the solvent is methylisobutylketone, methylamylketone, n-butyl acetate, or xylenes.

Para. Y. A process for preparing a stock phosphate ester-modified acrylic polyol, the process including providing an acrylic polyol in a solvent; and adding up to 10 wt %, based on the acrylic polyol, of a polyphosphoric acid to form the stock phosphate ester-modified acrylic polyol.

Para. Z. The process of Para. Y further including diluting the stock phosphate ester-modified acrylic polyol by additional solvent or mixing with a non-phosphate ester-modified acrylic polyol.

Para. AA. The process of Para. Z, wherein the solvent is methylisobutylketone, methylamylketone, n-butyl acetate, or xylenes.

Para. BB. The process of Para. Z or AA, wherein the non-phosphate ester-modified acrylic polyol is the acrylic polyol.

Para. CC. A process for preparing a phosphate ester-modified acrylic polyol, the process including mixing a phosphate ester-modified monomer with an acrylic, methacrylic, or styrenic monomer, or a mixture of any two or more thereof, in a solvent; and polymerizing the monomers to form the phosphate ester-modified acrylic polyol.

Para. DD. The process of Para. CC, wherein the phosphate ester monomer is 2-hydroxyethyl (meth)acrylate phosphate.

Para. EE. A coated substrate including a film adhered to and coating at least a portion of a substrate, the film including the reaction product of an isocyanate, a catalyst, and a phosphate ester-modified acrylic polyol; wherein: the phosphate ester-modified acrylic polyol includes greater than zero, but less than 1.0 wt % modification.

Para. FF. The coated substrate of Para. EE, wherein the phosphate ester-modified acrylic polyol includes greater than zero, but less than 0.3 wt % modification, or greater than zero, but less than 0.2 wt % modification.

Para. GG. The coated substrate of Para. EE or FF, wherein the catalyst is an organotin or organobismuth catalyst.

Para. HH. The coated substrate of Para. EE, FF, or GG, wherein the substrate includes glass, ceramic, wood, cement, plastic, paper, or cardboard.

While certain embodiments have been illustrated and described, it should be understood that changes and modifications can be made therein in accordance with ordinary skill in the art without departing from the technology in its broader aspects as defined in the following claims. For instance, there at least two methods of phosphate incorporation are demonstrated. In another, it would be entirely possible to achieve the pot-life extension with $H_3PO_4$ (phosphoric acid) alone, although the adhesion improvement might not be seen.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges, and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A composition comprising a phosphate ester-modified acrylic polyol and a catalyst, wherein:
    after addition of an isocyanate, the composition exhibits a longer pot-life than a composition comprising the reaction product of a non-phosphate ester-modified acrylic polyol;
    the catalyst comprises an organotin, organobismuth, organozinc, a metal octoate, or a metal dionate catalyst, wherein the catalyst is present in an amount of from at least 0.06 pHS to about 0.12 pHS;
    the phosphate ester-modified acrylic polyol comprises:
        greater than zero, but less than 1.0 wt % phosphate modification, wherein the wt % is based on the total weight of the phosphate ester-modified acrylic polyol; and (option 1) prior to phosphate modification, the phosphate ester-modified acrylic polyol comprises an acrylic polyol comprising polymerized monomers of:
an acrylic, methacrylic, or styrenic monomer, and
an allyl alcohol, 2-hydroxyethyl acrylate, 2-hydroxyethyl methacrylate, 2-hydroxypropyl acrylate, 2-hydroxypropyl methacrylate, or a mixture of two or more thereof; or
(option 2) prior to polymerization, the phosphate ester-modified acrylic polyol comprises:
an acrylic, methacrylic, or styrenic monomer and
a hydroxyethylmethacrylate-phosphate monomer;
wherein:
the acrylic, methacrylic, or styrenic monomer of (option 1) or (option 2) comprises acrylic acid, methacrylic acid, methyl methacrylate, ethyl acrylate, ethyl methacrylate, n-propyl acrylate, n-propyl methacrylate, n-butyl acrylate, n-butyl methacrylate, isopropyl acrylate, isopropyl methacrylate, isobutyl acrylate, isobutyl methacrylate, n-amyl acrylate, n-amyl methacrylate, n-hexyl acrylate, n-hexyl methacrylate, isoamyl acrylate, isoamyl methacrylate, trifluoroethyl acrylate, trifluoroethyl methacrylate, benzyl acrylate, benzyl methacrylate, 2-n-butoxyethyl acrylate, 2-n-butoxyethyl methacrylate, 2-chloroethyl acrylate, 2-chloroethyl methacrylate, sec-butyl acrylate, sec-butyl methacrylate, tert-butyl acrylate, tert-butyl methacrylate, 2-ethylbutyl acrylate, 2-ethylbutyl methacrylate, cinnamyl acrylate, cinnamyl methacrylate, cyclohexyl acrylate, cyclohexyl methacrylate, cyclopentyl acrylate, cyclopentyl methacrylate, 2-ethoxyethyl acrylate, 2-ethoxyethyl methacrylate, furfuryl acrylate, furfuryl methacrylate, hexafluoroisopropyl acrylate, hexafluoroisopropyl methacrylate, 3-methoxybutyl acrylate, 3-methoxybutyl methacrylate, 2-methoxybutyl acrylate, 2-methoxybutyl methacrylate, 2-nitro-2-methylpropyl acrylate, 2-nitro-2-methylpropyl methacrylate, n-octyl-acrylate, n-octyl-methacrylate, 2-ethylhexyl acrylate, 2-ethylhexyl methacrylate, 2-phenoxyethyl acrylate, 2-phenoxyethyl methacrylate, 2-phenylethyl acrylate, 2-phenylethyl methacrylate, phenyl acrylate, phenyl methacrylate, propargyl acrylate, propargyl methacrylate, tetrahydrofurfuryl acrylate, tetrahydrofurfuryl methacrylate, tetrahydropyranyl acrylate, tetrahydropyranyl methacrylate, styrene, α-methylstyrene, or a mixture of any two or more thereof.

2. The composition of claim 1, wherein the phosphate ester-modified acrylic polyol comprises greater than zero, but less than 0.5 wt % phosphate modification.

3. The composition of claim 2, wherein the phosphate ester-modified acrylic polyol comprises greater than zero, but less than 0.3 wt % phosphate modification.

4. The composition of claim 3, wherein the phosphate ester-modified acrylic polyol comprises greater than zero, but less than 0.2 wt % phosphate modification.

5. The composition of claim 1, wherein the phosphate ester-modified acrylic polyol is the reaction product of the acrylic polyol (option 1) and X wt % polyphosphoric acid, based upon the acrylic polyol, wherein $0.01 \leq X \leq 1.0$.

6. The composition of claim 5, wherein the reaction product further comprises a residue of an initiator used in the reaction, and wherein the initiator was a dialkyl peroxide, an alkyl peroxy ester, or a free radical, azo-based initiator.

7. The composition of claim 1 further comprising the isocyanate and wherein the isocyanate comprises diphenyl diisocyanate, 1,6-hexamethylenediisocyanate, isophorone diisocyanate, a trimer of isophorone diisocyanate, 2,4-toluene diisocyanate, 2,6-toluene diisocyanate, methylene diphenyl diisocyanate, a polymeric methylene diphenyl diisocyanate, methylene bis-cyclohexyldiisocyanate, naphthalene diisocyanate, hydrogenated methylene diphenyl diisocyanate, a trimer of hexamethylenediisocyanate, an allophanate, a biuret, or a mixture of any two or more thereof.

8. The composition of claim 1, wherein the catalyst comprises triphenylbismuth, dibutyltindilaurate, dibutyltindiacetate, dioctyltindilaurate, zinc octoate, tin ocoate, zirconium dionate, cobalt dionate, or a mixture of any two or more thereof.

9. The composition of claim 1 which exhibits improved adhesion when compared to a composition comprising the reaction product of a non-phosphate ester-modified acrylic polyol.

10. A two-component coating package comprising:
a first component comprising an isocyanate; and
a second component comprising a phosphate ester-modified acrylic polyol; and
a catalyst comprising an organotin, organobismuth, organozinc, a metal octoate, or a metal dionate catalyst, wherein the catalyst is present in an amount from about 0.06 pHS to about 0.12 pHS,
wherein:
after combining the first component and the second component, the two-component coating package exhibits a longer pot-life than a two-component coating package comprising the reaction product of a non-phosphate ester-modified acrylic polyol;
the phosphate ester-modified acrylic polyol comprises:
greater than zero, but less than 1.0 wt % phosphate modification, wherein the wt % is based on the total weight of the phosphate ester-modified acrylic polyol; and
(option 1) prior to phosphate modification, the phosphate ester-modified acrylic polyol comprises an acrylic polyol comprising polymerized monomers of:
an acrylic, methacrylic, or styrenic monomer, and
an allyl alcohol, 2-hydroxyethyl acrylate, 2-hydroxyethyl methacrylate, 2-hydroxypropyl acrylate, 2-hydroxypropyl methacrylate, or a mixture of two or more thereof; or
(option 2) prior to polymerization, the phosphate ester-modified acrylic polyol comprises:
an acrylic methacrylic, or styrenic monomer, and a hydroxyethylmethacrylate-phosphate monomer;
wherein:
the acrylic, methacrylic, or styrenic monomer of option 1 or option 2 comprises acrylic acid, methacrylic acid, methyl methacrylate, ethyl acrylate, ethyl methacrylate, n-propyl acrylate, n-propyl methacrylate, n-butyl acrylate, n-butyl methacrylate, isopropyl acrylate, isopropyl methacrylate, isobutyl acrylate, isobutyl methacrylate, n-amyl acrylate, n-amyl methacrylate, n-hexyl acrylate, n-hexyl methacrylate, isoamyl acrylate, isoamyl methacrylate, trifluoroethyl acrylate, trifluoroethyl methacrylate, benzyl acrylate, benzyl methacrylate, 2-n-butoxyethyl acrylate, 2-n-butoxyethyl methacrylate, 2-chloroethyl acrylate, 2-chloroethyl methacrylate, sec-butyl acrylate, sec-butyl methacrylate, tert-butyl acrylate, tert-butyl methacrylate, 2-ethylbutyl acrylate, 2-ethylbutyl methacrylate, cinnamyl acrylate, cinnamyl methacrylate, cyclohexyl acrylate, cyclohexyl methacrylate, cyclopentyl acrylate, cyclopentyl methacrylate, 2-ethoxyethyl acrylate, 2-ethoxyethyl methacrylate, furfuryl acrylate, furfuryl methacrylate, hexafluoroisopropyl acrylate, hexafluoroisopropyl methacrylate, 3-methoxybutyl acrylate, 3-methoxybutyl methacrylate, 2-methoxybutyl acrylate, 2-methoxybutyl methacrylate, 2-nitro-2-methylpropyl acrylate, 2-nitro-2-methylpropyl methacrylate, n-octyl-acrylate, n-octyl-methacrylate, 2-ethylhexyl acrylate, 2-ethylhexyl methacrylate, 2-phenoxyethyl acrylate, 2-phenoxyethyl methacrylate, 2-phenylethyl acrylate, 2-phenylethyl methacrylate, phenyl acrylate, phenyl methacrylate, propargyl acrylate, propargyl methacrylate, tetrahydrofurfuryl acrylate, tetrahydrofurfuryl methacrylate, tetrahydropyranyl acrylate, tetrahydropyranyl methacrylate, styrene, a-methylstyrene, or a mixture of any two or more thereof.

11. The two-component coating package of claim 10, wherein the phosphate ester-modified acrylic polyol comprises greater than zero, but less than 0.5 wt % phosphate modification.

12. The two-component coating package of claim 11, wherein the phosphate ester-modified acrylic polyol comprises greater than zero, but less than 0.2 wt % phosphate modification.

13. The two-component coating package of claim 10, wherein the catalyst is present in the first component, the second component, or both the first component and the second component.

14. The two-component coating package of claim 10, wherein the isocyanate comprises diphenyl diisocyanate, 1,6-hexamethylenediisocyanate, isophorone diisocyanate, a trimer of isophorone diisocyanate, 2,4-toluene diisocyanate, 2,6-toluene diisocyanate, methylene diphenyl diisocyanate, a polymeric methylene diphenyl diisocyanate, methylene bis-cyclohexyldiisocyanate, naphthalene diisocyanate, hydrogenated methylene diphenyl diisocyanate, a trimer of hexamethylenediisocyanate, an allophanate, a biuret, or a mixture of any two or more thereof.

15. A composition comprising a phosphate ester-modified acrylic polyol and a catalyst, wherein:
   after addition of an isocyanate, the composition exhibits a longer pot-life than a composition comprising the reaction product of a non-phosphate ester-modified acrylic polyol;
   the catalyst comprises an organotin catalyst, wherein the catalyst is present in an amount of from 0.06 pHS to about 0.12 pHS;
   the phosphate ester-modified acrylic polyol comprises:
      greater than zero, but less than 1.0 wt % phosphate modification, wherein the wt % is based on the total weight of the phosphate ester-modified acrylic polyol; and
   (option 1) prior to phosphate modification, the phosphate ester-modified acrylic polyol comprises an acrylic polyol comprising polymerized monomers of:
      an acrylic, methacrylic, or styrenic monomer, and
      an allyl alcohol, 2-hydroxyethyl acrylate, 2-hydroxyethyl methacrylate, 2-hydroxypropyl acrylate, 2-hydroxypropyl methacrylate, or a mixture of two or more thereof; or
   (option 2) prior to polymerization, the phosphate ester-modified acrylic polyol comprises:
      an acrylic, methacrylic, or styrenic monomer and
      a hydroxyethylmethacrylate-phosphate monomer;
   wherein:
      the acrylic, methacrylic, or styrenic monomer of (option 1) or (option 2) comprises acrylic acid, methacrylic acid, methyl methacrylate, ethyl acrylate, ethyl methacrylate, n-propyl acrylate, n-propyl methacrylate, n-butyl acrylate, n-butyl methacrylate, isopropyl acrylate, isopropyl methacrylate, isobutyl acrylate, isobutyl methacrylate, n-amyl acrylate, n-amyl methacrylate, n-hexyl acrylate, n-hexyl methacrylate, isoamyl acrylate, isoamyl methacrylate, trifluoroethyl acrylate, trifluoroethyl methacrylate, benzyl acrylate, benzyl methacrylate, 2-n-butoxyethyl acrylate, 2-n-butoxyethyl methacrylate, 2-chloroethyl acrylate, 2-chloroethyl methacrylate, sec-butyl acrylate, sec-butyl methacrylate, tert-butyl acrylate, tert-butyl methacrylate, 2-ethylbutyl acrylate, 2-ethylbutyl methacrylate, cinnamyl acrylate, cinnamyl methacrylate, cyclohexyl acrylate, cyclohexyl methacrylate, cyclopentyl acrylate, cyclopentyl methacrylate, 2-ethoxyethyl acrylate, 2-ethoxyethyl methacrylate, furfuryl acrylate, furfuryl methacrylate, hexafluoroisopropyl acrylate, hexafluoroisopropyl methacrylate, 3-methoxybutyl acrylate, 3-methoxybutyl methacrylate, 2-methoxybutyl acrylate, 2-methoxybutyl methacrylate, 2-nitro-2-methylpropyl acrylate, 2-nitro-2-methylpropyl methacrylate, n-octyl-acrylate, n-octyl-methacrylate, 2-ethylhexyl acrylate, 2-ethylhexyl methacrylate, 2-phenoxyethyl acrylate, 2-phenoxyethyl methacrylate, 2-phenylethyl acrylate, 2-phenylethyl methacrylate, phenyl acrylate, phenyl methacrylate, propargyl acrylate, propargyl methacrylate, tetrahydrofurfuryl acrylate, tetrahydrofurfuryl methacrylate, tetrahydropyranyl acrylate, tetrahydropyranyl methacrylate, styrene, α-methylstyrene, or a mixture of any two or more thereof.

16. The composition of claim 15 further comprising the isocyanate and wherein the isocyanate comprises diphenyl diisocyanate, 1,6-hexamethylenediisocyanate, isophorone diisocyanate, a trimer of isophorone diisocyanate, 2,4-toluene diisocyanate, 2,6-toluene diisocyanate, methylene diphenyl diisocyanate, a polymeric methylene diphenyl diisocyanate, methylene bis-cyclohexyldiisocyanate, naphthalene diisocyanate, hydrogenated methylene diphenyl diisocyanate, a trimer of hexamethylenediisocyanate, an allophanate, a biuret, or a mixture of any two or more thereof.

* * * * *